United States Patent
Channell

(10) Patent No.: US 7,792,738 B2
(45) Date of Patent: Sep. 7, 2010

(54) DISPLAYING FINANCIAL INFORMATION BASED ON LOCATION

(75) Inventor: Brian Paul Channell, Redondo Beach, CA (US)

(73) Assignee: Yahoo! Inc., Sunnyvale, CA (US)

( * ) Notice: Subject to any disclaimer, the term of this patent is extended or adjusted under 35 U.S.C. 154(b) by 633 days.

(21) Appl. No.: 11/737,933

(22) Filed: Apr. 20, 2007

(65) Prior Publication Data

US 2008/0262952 A1    Oct. 23, 2008

(51) Int. Cl.
  *G06Q 40/00*    (2006.01)
(52) U.S. Cl. ....................................................... 705/37
(58) Field of Classification Search .................... 705/37
  See application file for complete search history.

(56) References Cited

U.S. PATENT DOCUMENTS

| | | | |
|---|---|---|---|
| 7,596,509 B1 * | 9/2009 | Bryson ........................ | 705/26 |
| 2002/0013736 A1 * | 1/2002 | I'Anson et al. ............... | 705/26 |
| 2006/0085310 A1 * | 4/2006 | Mylet et al. .................... | 705/35 |
| 2007/0282698 A1 * | 12/2007 | Huberman et al. ............ | 705/26 |

OTHER PUBLICATIONS

Little, "Understanding Stock Quotes," stocks.about.com, http://stocks.about.com/b/a/138608.htm, Jan. 11, 2005.

* cited by examiner

*Primary Examiner*—Stefanos Karmis
*Assistant Examiner*—Jessica L Lemieux
(74) *Attorney, Agent, or Firm*—Weaver Austin Villeneuve & Sampson LLP

(57) ABSTRACT

According to various embodiments of the present invention, geographic information about the location of a user is utilized to select a grouping of additional securities to display to the user. When the user navigates to a portion of a web site related to displaying financial information, a listing of securities that might be interesting to the user may be displayed. As a result, the user is more likely to find out more information relating to one or more of these additional securities, and therefore generate more page views on the system.

16 Claims, 2 Drawing Sheets

DISPLAYING FINANCIAL INFORMATION BASED ON LOCATION

BACKGROUND OF THE INVENTION

1. Field of the Invention

The present invention relates to Internet web sites. More particularly, the present invention relates to the display of financial information on an Internet web site based on the location of the user.

2. Description of the Related Art

Financial-related web sites are prevalent on the World-Wide Web. Users have grown accustomed to utilizing these web sites to find out information about various securities, such as stocks, mutual funds, etc. Typically users are most interested in the prices of these securities but other financial information, such as earnings results and analyst ratings are also of interest to users.

Many financial-related web sites generate revenue through advertising. As such, every additional page view by a user results in at least the possibility of more revenue. Therefore, increasing user interest in pursuing additional queries on the web site is of prime importance to web site operators.

SUMMARY OF THE INVENTION

According to various embodiments of the present invention, geographic information about the location of a user is utilized to select a grouping of additional securities to display to the user. When the user navigates to a portion of a web site related to displaying financial information, a listing of securities that might be interesting to the user may be displayed. As a result, the user is more likely to find out more information relating to one or more of these additional securities, and therefore generate more page views on the system.

DETAILED DESCRIPTION OF SPECIFIC EMBODIMENTS

Figure 1:
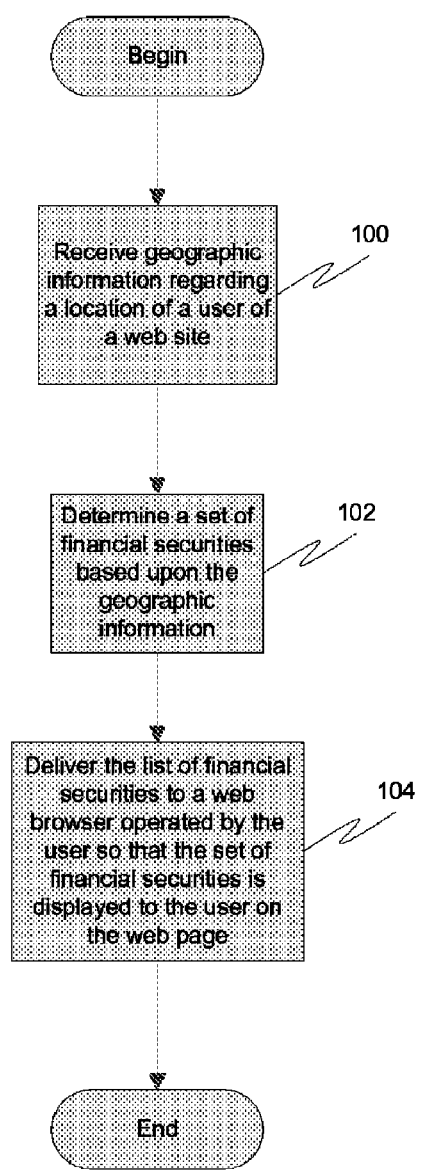
FIG. 1 is a flow diagram illustrating a method for displaying financial security information to a user in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, geographic information about the location of a user is utilized to select a grouping of additional securities to display to the user. When the user navigates to a portion of a web site related to displaying financial information, a listing of securities that might be interesting to the user may be displayed. As a result, the user is more likely to find out more information relating to one or more of these additional securities, and therefore generate more page views on the system.

In an embodiment of the present invention, a location manager is utilized to determine and track the geographic location of the user. This location manager may use, for example, a zip code entered by the user to determine the location. Alternatively, the location manager may utilize the Internet Protocol (IP) address of the user to determine the location. A cookie may then be used to keep the information regarding the user on the user's computer so that subsequent web sessions do not require that the geographic location determination be performed again. This information may also be saved on a centralized server for remote retrieval from any location.

The geographic information may be utilized by the web site when a user arrives at a financial-related page of the web site or enters a financial-related query (such as a request for a stock quote). The most popular securities for the user's geographic location may then be displayed in a section of the screen. These may be labeled as, for example, "other securities that might interest you." The geographic location may be represented and employed at many different granularities. For example, in one embodiment the geographic location may simply be the country in which the user is located. In another embodiment, the geographic location may be the city in which the user is location. In another embodiment, the geographic location may be a section of the city in which the user is located, and so on.

The most popular securities in the user's geographic location may be determined by accessing usage pattern data regarding all or a subset of the users of the web site. A database of usage information may be compiled and this database may be searched for information relating to which securities are the subject of the most financial information requests. In one embodiment, these financial information requests may simply be stock quotes, but embodiments are envisioned wherein any other request or reference regarding the security may be utilized, such as company information, trend charts, and analyst estimates.

In some instances, contractual agreements may act to restrict the securities that can be shown to a particular user. For example, a particular exchange may have a contract with a web site that restricts the web site from displaying stock quote information to users in certain countries. An embodiment of the present invention takes into account these types of contractual limitations when selecting the securities to display to the user.

The present invention allows geographic information to be used to better display potential securities for the user to click (i.e., select securities with a high likelihood of interest). Such a tactic is more effective in certain geographic locations than others. For example, in an area like Iowa where agriculture is a primary source of income for the region, users viewing stock quotes may indeed be more likely to view securities which are of interest to others in the region, as there is a high likelihood that many people in the area are interested in agriculture-related stocks. Other examples of geographic areas in which regional characteristics are likely to correlate with interest in specific types of securities include retirement areas such as Florida and Arizona, and high technology areas such as Silicon Valley and Seattle.

In another embodiment of the invention, geographic information is only one factor in the determination of which additional securities to display to the user. Other factors may include user profile information (such as occupation, gender, age, etc.) and prior web usage activity, among others.

FIG. 1 is a flow diagram illustrating a method for displaying financial security information to a user in accordance with an embodiment of the present invention. At 100, geographic information regarding a location of a user of a web site is determined or received. This geographic information may be stored, for example, in a cookie on the user's computer and a web site may gain access to the cookie through the user's web browser. The cookie may have been placed there by a location manager based on, for example, a zip code the user has entered, or the user's IP address. The geographic information may be determined or gathered in many different ways. In one embodiment, the present invention merely receives the geographic information from another component or entity that compiles the geographic information. In another embodiment, a component of the present invention actively determines or gathers geographic information.

In a specific embodiment, a finance badge (logo and code) can be made available to web publishers to put on their site. The badge may allow users to enter location information. This information may then be aggregated. This embodiment may also involve filtering the securities to show listings that are customized for the publisher.

At 102, a set of financial securities is determined based upon the geographic information. The set of securities may include, for example, the most popular securities in the location indicated by the geographic information. The set may also be determined based on factors other than the geographic information, such as, for example, user profile information and web usage patterns. At 104, the set of financial securities is delivered to the web browser operated by the user so that the set of financial securities is displayed to the user on the web page. This set may be displayed along with information specifically requested by the user, such as, for example, a stock quote.

As will be understood, each of the processes depicted in FIG. 1 may be performed by a financial security display module of software operating on a server.

Figure 2:
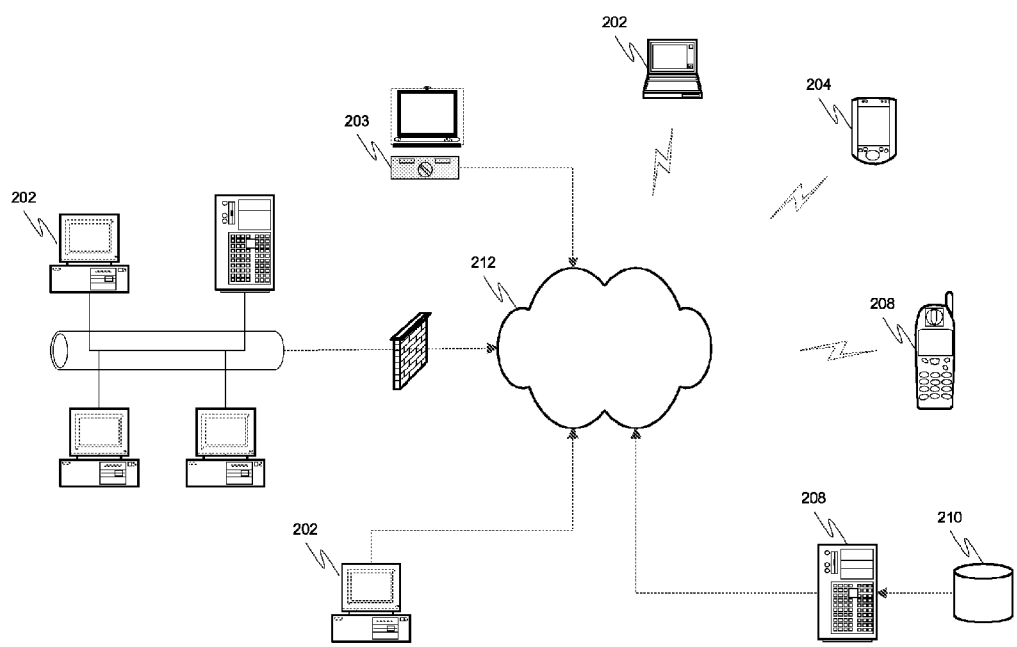
FIG. 2 is an exemplary network diagram illustrating some of the platforms that may be employed with various embodiments of the invention.

It should also be noted that embodiments of the present invention may be implemented on any computing platform and in any network topology in which presentation of financial and/or securities information is a useful functionality. For example and as illustrated in FIG. 2, implementations are contemplated in which geographic location, profile, and web usage pattern information (among other information) is collected in a network containing personal computers 202, media computing platforms 203 (e.g., cable and satellite set top boxes with navigation and recording capabilities (e.g., Tivo)), handheld computing devices (e.g., PDAs) 204, cell phones 206, or any other type of portable communication platform. Users of these devices may navigate the network, and this information may be collected by server 208. Server 208 (or any of a variety of computing platforms) may include a memory, a processor, and a communications component and may then utilize the various techniques described above to determine financial securities to display to the user based on the user's geographic location, which may be stored on the user device in the form of a cookie. The processor of the server 208 may be configured to run, for example, all of the processes described in FIG. 1. Server 208 may be coupled to a database 210, which stores information linking geographic regions to financial securities likely to be of interest to users in the geographic regions. Applications may be resident on such devices, e.g., as part of a browser or other application, or be served up from a remote site, e.g., in a Web page (also represented by server 208 and database 210). Database 210 may store the information regarding financial securities associated with each geographic location. The invention may also be practiced in a wide variety of network environments (represented by network 212), e.g., TCP/IP-based networks, telecommunications networks, wireless networks, etc. The invention may also be tangibly embodied in one or more program storage devices as a series of instructions readable by a computer (i.e., in a computer readable medium).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method comprising:
receiving geographic information regarding a location of a user who is accessing financial information;
determining, using a processor, a selected set of financial securities that is additional to the financial information accessed by the user and is based upon the received geographic information, wherein determining includes selecting the selected set of financial securities from a plurality of sets of financial securities, and wherein the selected set of financial securities is determined to interest users within the received geographical information;
wherein the selected set of financial securities is determined from a database, which stores information linking specific geographic regions to specific financial securities that are likely to be of interest to users in such specific geographic regions;
wherein the database also stores information linking one or more sets of financial securities to one or more contractual agreements that each limit displaying certain financial securities from being displayed to users in one or more restricted geographical regions and determining is further based on such one or more contractual agreements; and
delivering the selected set of financial securities to a web browser operated by the user so that the selected set of financial securities is displayed to the user on a web page.

2. The method of claim 1, wherein the geographic information is obtained from a cookie saved on the user's computer.

3. The method of claim 2, wherein the geographic information was initially saved on the user's computer by a location manager with reference to the user's zip code.

4. The method of claim 2, wherein the geographic information was initially saved on the user's computer by a location manager with reference to the user's Internet Protocol (IP) address.

5. The method of claim 1, wherein the set of securities includes the most popular securities in a geographic area including the location indicated by the geographic information.

6. The method of claim 1, wherein the determining is based also on at least one factor other than the geographic information.

7. The method of claim 6, wherein the at least one factor includes user profile information.

8. The method of claim 1, further comprising:
providing code to be placed on web sites, wherein the code is executable to receive input relating to geographic information from users and forward the input to a centralized location for aggregation.

9. The method of claim 8, wherein the delivering includes delivering a customized set of financial securities to the web browser based upon the input received from web sites containing the code.

10. An apparatus comprising at least a processor and a memory, wherein the at least one processor and memory are configured to:
- receive geographic information regarding a location of a user who is accessing financial information;
- determine a selected set of financial securities that is additional to the financial information accessed by the user and is based upon the received geographic information, wherein determining includes selecting the selected set of financial securities from a plurality of sets of financial securities, and wherein the selected set of financial securities is determined to interest users within the received geographical information;
- wherein the selected set of financial securities is determined from a database, which stores information linking specific geographic regions to specific financial securities that are likely to be of interest to users in such specific geographic regions;
- wherein the database also stores information linking one or more sets of financial securities to one or more contractual agreements that each limit displaying certain financial securities from being displayed to users in one or more restricted geographical regions and determining is further based on such one or more contractual agreements; and
- deliver the selected set of financial securities to a web browser operated by the user so that the selected set of financial securities is displayed to the user on a web page.

11. The apparatus of claim 10, wherein the geographic information is obtained from a cookie saved on the user's computer.

12. The apparatus of claim 11, wherein the geographic information was initially saved on the user's computer by a location manager contained on the apparatus, with reference to the user's zip code.

13. The apparatus of claim 11, wherein the geographic information was initially saved on the user's computer by a location manager contained on the apparatus, with reference to the user's Internet Protocol (IP) address.

14. A server comprising:
- an interface coupled to a database, wherein the database stores information linking geographic regions to financial securities likely to be of interest to users in the geographic regions;
- a processor configured to:
- receive geographic information regarding a location of a user who is accessing financial information;
- determine a selected set of financial securities that is additional to the financial information accessed by the user and is based upon the received geographic information, wherein determining includes selecting the selected set of financial securities from a plurality of sets of financial securities, and wherein the selected set of financial securities is determined to interest users within the received geographical information;
- wherein the selected set of financial securities is determined from a database, which stores information linking specific geographic regions to specific financial securities that are likely to be of interest to users in such specific geographic regions;
- wherein the database also stores information linking one or more sets of financial securities to one or more contractual agreements that each limit displaying certain financial securities from being displayed to users in one or more restricted geographical regions and determining is further based on such one or more contractual agreements; and
- deliver the selected set of financial securities to a web browser operated by the user so that the selected set of financial securities is displayed to the user on a web page.

15. The server of claim 14, wherein the geographic information was initially saved on the user's computer by a location manager with reference to the user's zip code.

16. The server of claim 14, wherein the geographic information was initially saved on the user's computer by a location manager with reference to the user's Internet Protocol (IP) address.

* * * * *